June 29, 1926.

F. H. RAGAN

BUSHING FOR MOTOR VEHICLE STEERING COLUMNS

Filed Nov. 29, 1920

1,590,205

Inventor
Frederick H. Ragan

By Whittemore Hulbert & Whittemore
Attorneys

Patented June 29, 1926.

1,590,205

UNITED STATES PATENT OFFICE.

FREDERICK H. RAGAN, OF DETROIT, MICHIGAN, ASSIGNOR, BY MESNE ASSIGNMENTS, TO GEMMER MANUFACTURING COMPANY, A CORPORATION OF MICHIGAN.

BUSHING FOR MOTOR-VEHICLE STEERING COLUMNS.

Application filed November 29, 1920. Serial No. 427,175.

The invention relates to steering gears for motor vehicles and has particular reference to the bushing or bearing for the revoluble steering stem at the upper end of the stationary column adjacent to the steering wheel. It is the object of the invention to obtain a construction which is easily applied, will initially form and will maintain a noiseless bearing and which will avoid the necessity of manufacturing closely fitting parts. To this end the invention consists in the construction as hereinafter set forth.

In the manufacture of motor vehicle steering gears it is usual to pass the rotating steering spindle through a stationary tubular column and to support the upper end of the rotary stem in a bushing which is inserted in the stationary tube. Where metallic bushings are used for this purpose, it is necesary to maintain closely fitting parts, which requires the accurate machining or grinding of both the stem and the column and which therefore increases the cost of manufacture. Moreover, with metallic bushings there is danger of "freezing" of the bearing if it is not at all times lubricated. Other materials have been employed for forming such bearings, but these also have been open to various objections which either increase the cost of manufacture or fail to maintain good operating conditions. The present invention overcomes these objections by the forming of the bushing of a material which is self-adjusting, both to the spindle and to the column, dispensing on the one hand with close fits in original manufacture and on the other hand maintaining a close fit after long service.

Figure 1:
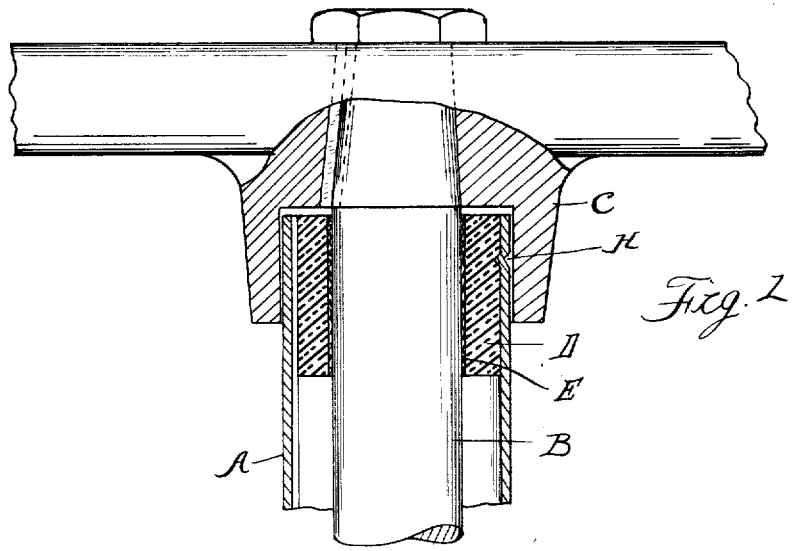
Figure 1 is a longitudinal section through the bearing.
Figure 2:
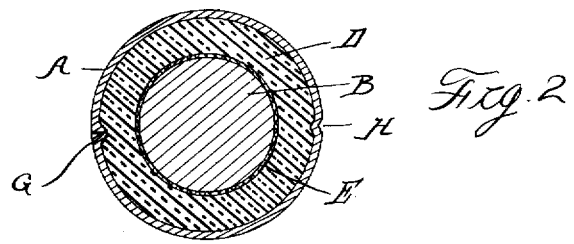
Figure 2 is a transverse section thereof.
Figure 3:
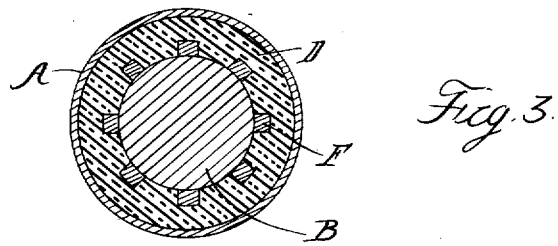
Figure 3 is a similar view showing a modified construction.

In detail, A is the stationary tube or column, B is the rotating stem passing therethrough, and C is the steering wheel attached to said stem. D is the bushing of my improved construction which is formed of a resilient yieldable material, preferably rubber. This bushing is provided with a lining face for direct engagement with the revolving spindle, which is formed of some material having better wearing properties than the rubber, but which is adjustable under the resilient pressure of the rubber body. As shown in Figure 2, the lining E is formed of fabric impregnated with graphite. In Figure 3 in place of this fabric lining a number of inserts F, preferably formed of metal, are distributed around the bushing and form bearing surfaces for direct contact with the metal of the stem. With each of these constructions the outer diameter of the bushing is such as to fit the largest column within the limit of tolerance, while it is equally adapted for engagement with a smaller tube by a slight compression of the material. In the same manner the inner diameter of the bushing is such that it will closely fit the smallest stem within the limit of tolerance and is capable of expansion for engagement with larger stems.

In the manufacture of the tubular steering columns it is customary to form the same from sheet metal but welding the edges to form a seam. This welding operation results in the deflection of a portion of the metal inward, forming a bead as indicated at G. This bead will serve to hold the bushing D from rotation and the latter is therefore provided with a longitudinal groove for fitting over the bead. The bushing may also be locked from longitudinal movement by striking in one or more points, as indicated at H.

What I claim as my invention is:

1. In a steering gear, the combination with a stationary tubular column, and a rotatable stem therein, of a bushing forming a bearing for said stem within said column formed of a rubber body.

2. In a steering gear, the combination with a stationary tubular column, and a rotatable stem therein, of a bushing forming a bearing for said stem within said column, said bushing being formed of resilient yieldable material and having an expansible lining of different material for engaging the stem.

3. In a steering gear, the combination with a stationary tubular column and a rotatable stem therein, of a bushing forming a bearing for said stem within said column, said bushing being formed of rubber having an expansible lining of different material for direct engagement with the stem, and the dimensions being such as to be automatically adjustable to variations in sizes of the cooperating parts within a limited tolerance.

4. In a steering gear, the combination with a stationary tubular column, of a rotatable stem therein and a bushing constituting a bearing for said stem located within said column, said bushing formed of resilient yieldable material and including an expansible lining of a different material, said column and bushing having interlocking engagement with each other to prevent relative rotation.

5. In a steering gear, the combination with a stationary tubular column, of a rotatable stem therein and a bushing constituting a bearing for said stem located within said column, said bushing formed of resilient yieldable material and including an expansible lining of a different material, said column and bushing having interlocking engagement with each other to prevent relative longitudinal movement.

6. In a steering gear, the combination with a stationary tubular column, of a rotatable stem therein and a bushing constituting a bearing for said stem located within said column, said bushing formed of resilient yieldable material and including an expansible lining of a different material, said column and bushing having interlocking engagement with each other to prevent relative rotation and longitudinal movement.

In testimony whereof I affix my signature.

FREDERICK H. RAGAN.

automatically adjustable to variations in sizes of the cooperating parts within a limited tolerance.

4. In a steering gear, the combination with a stationary tubular column, of a rotatable stem therein and a bushing constituting a bearing for said stem located within said column, said bushing formed of resilient yieldable material and including an expansible lining of a different material, said column and bushing having interlocking engagement with each other to prevent relative rotation.

5. In a steering gear, the combination with a stationary tubular column, of a rotatable stem therein and a bushing constituting a bearing for said stem located within said column, said bushing formed of resilient yieldable material and including an expansible lining of a different material, said column and bushing having interlocking engagement with each other to prevent relative longitudinal movement.

6. In a steering gear, the combination with a stationary tubular column, of a rotatable stem therein and a bushing constituting a bearing for said stem located within said column, said bushing formed of resilient yieldable material and including an expansible lining of a different material, said column and bushing having interlocking engagement with each other to prevent relative rotation and longitudinal movement.

In testimony whereof I affix my signature.

FREDERICK H. RAGAN.

DISCLAIMER.

1,590,205.—*Frederick H. Ragan*, Detroit, Mich. BUSHING FOR MOTOR-VEHICLE STEERING COLUMNS. Patent dated June 29, 1926. Disclaimer filed October 29, 1926, by the assignee by mesne assignments, *Gemmer Manufacturing Company*.
Hereby disclaims claim 1.
[*Official Gazette November 16, 1926.*]

DISCLAIMER.

1,590,205.—*Frederick H. Ragan*, Detroit, Mich. BUSHING FOR MOTOR-VEHICLE STEERING COLUMNS. Patent dated June 29, 1926. Disclaimer filed October 29, 1926, by the assignee by mesne assignments, *Gemmer Manufacturing Company*.
Hereby disclaims claim 1.
[*Official Gazette November 16, 1926.*]